United States Patent Office 3,749,678
Patented July 31, 1973

3,749,678
RATE STABILIZERS FOR CHEMICAL OXYGEN GENERATORS

Tommy Lewis Thompson, Melbourne, Fla., assignor to Life Support, Inc., Melbourne, Fla.
Continuation-in-part of application Ser. No. 138,299, Apr. 28, 1971, now Patent No. 3,702,305, which is a continuation-in-part of abandoned application Ser. No. 66,555, Aug. 24, 1970. This application Sept. 15, 1971, Ser. No. 180,745
Int. Cl. A62b 21/00; C01b 13/02
U.S. Cl. 252—187 R          20 Claims

ABSTRACT OF THE DISCLOSURE

Chemical oxygen generators made from an alkali metal chlorate such as sodium chlorate and sodium or potassium oxides as catalysts can be made to produce a relatively steady flow of oxygen if there is incorporated in the mixed composition a small amount of material such as powdered glass, silica or mica. In the absence of these materials the rate of oxygen flow is unsteady, whereas the addition of about .5 to 6% by weight of these materials produces a relatively steady flow of oxygen over the life of the composition.

CROSS-REFERENCES TO RELATED APPLICATIONS

This application is a continuation-in-part of application Ser. No. 138,299, filed Apr. 28, 1971, now Pat. No. 3,702,305, issued Nov. 7, 1972, which in turn is a continuation-in-part of abandoned application Ser. No. 66,555, filed Aug. 24, 1970. The disclosures of said applications are incorporated herein by reference.

BACKGROUND OF THE INVENTION

This invention relates to low temperature operating chemical oxygen generators in the form of disposable candles disclosed and claimed in the application of John P. Churchill and Tommy Lewis Thompson, Ser. No. 143,853, entitled, "Oxygen Generator Cell." The oxygen generating chemicals used in the candles disclosed in this application are sodium chlorate catalyzed with sodium oxide which may be sodium monoxide or peroxide or a mixture of the two.

Regardless of the mixing or grinding techniques employed in preparing the composition of these candles, it had been found that undesirable variations in rate of oxygen production occur. The present invention is designed to overcome the variation in oxygen production.

SUMMARY OF THE INVENTION

The present invention provides a composition which can be compressed into the form of a candle and when the candle is ignited it will produce oxygen at a relatively uniform rate. This improvement is obtained by intimately mixing with the chlorate and sodium oxide a small amount of a material from the group consisting of finely ground glass, silica and/or mica. To obtain the best results it is important that the material be in finely divided state and that it be homogeneously mixed with the other components of the candle before the composition is compressed into the form of a solid candle for insertion in a can.

It is an object of this invention to provide a chemical oxygen generating composition which will provide oxygen at a relatively steady rate.

It is another object of the invention to provide a chemical oxygen generating composition which will provide oxygen at a relatively steady rate and which decomposes at a relatively low temperature.

It is a further object of this invention to provide a chemical oxygen generator composition which will decompose at relatively low temperature to give a relatively steady rate of oxygen production without decreasing the life of the composition.

A still further object of the invention is to provide a chemical oxygen generator which is capable of producing oxygen at a relatively steady rate without contaminating the oxygen produced.

Other objects of the invention will become apparent from the following detailed description.

DETAILED DESCRIPTION

Figure 1:
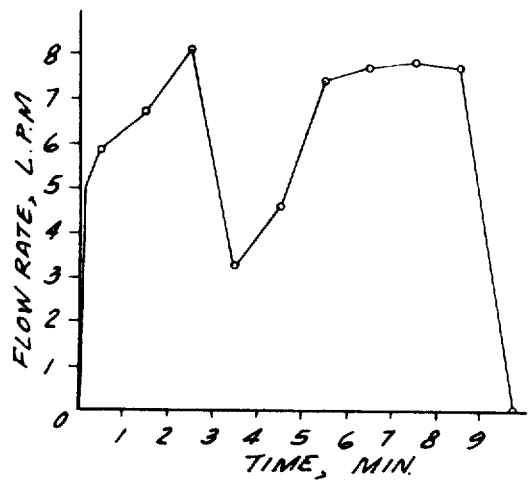
FIGS. 1 and 2 are graphs showing rate of oxygen production from candles prepared in accordance with the teaching of application Ser. No. 143,853.

As set forth in the aforesaid application Ser. No. 143,853, candles prepared by compressing a mixture of an alkali metal chlorate such as sodium chlorate and a sodium oxide catalyst which may be either sodium monoxide, sodium peroxide, or a mixture of the two are capable of generating substantially pure oxygen at a relatively low temperature. The rate of burning of the candle is controlled to some extent by the amount of the sodium oxide catalyst contained in the mixture. Potassium oxides, such as potassium monoxide, potassium peroxide, and potassium superoxide are also useful. Mixtures of the sodium and potassium oxides may be used. Generally speaking, the composition will contain from 0.5 to 20% by weight of the sodium or potassium oxide catalyst. The use of fuels is avoided in order to avoid the production of high temperature during the decomposition of the chlorate and also to avoid contamination of the oxygen produced.

It has been found that undesirable variations in rate of oxygen produced occur regardless of the mixing or grinding techniques used in preparing sodium chloratesodium oxide generators. It was suspected that water vapor in the air might be the cause of deactivating the generator mix causing the wide variation, but testing of generators constructed in a dry room showed that these variations occurred even when the units were manufactured under very dry conditions.

It has been discovered that if a small amount of silica or certain natural or synthetic silicates is added to the composition large variations in rate of oxygen flow can be eliminated and the rate of flow can be maintained on a relatively constant rate. Although naturally occurring micas such as muscovite and phlogopite have been found to be useful, they frequently contain impurities which contaminate the oxygen produced. On the other hand, high purity natural-occurring silica such as glass sand and quartz, and insoluble synthetic silicates, such as vitreous glasses or mica, produce pure oxygen. Various other materials such as silica gel, super floss and various metal oxides have been tested to determine their effect on variation in oxygen flow and were found to have no beneficial effect.

The following Tables I to V represent the results obtained on testing five different compositions to show rate of oxygen flow over the life of the candle. The candles which were tested and reported in the table were made by placing 200 grams of the composition to be tested in a mold two and one-half inches long and one and seveneighths inches in diameter. The composition was subjected to a pressure of 25 tons to compress it into the form of a candle with a cone at the top. Into the cone was placed 10 grams of the following composition to act as an ignition cone:

| | Percent by weight |
|---|---|
| Sodium iodate | 41.1 |
| Commercial sodium oxide powder | 44.1 |
| Magnesium perchlorate | 5.8 |
| Sodium perchlorate | 9 |

The candle with its ignition cone was placed in a tin can and ignited with 2.5 grams of water-actuated, loose cone material. Oxygen was withdrawn from the top of the can. Flow rates were measured by reading a wet test meter for each minute. The rate was determined by the differences in the readings. The meter gave the total volume of oxygen which passed through it.

TABLE I

| | Cumulative volume [1] | Average rate |
|---|---|---|
| Time, minutes: | | |
| 0.5 | | 5.9 |
| 1.0 | 5.9 | |
| 1.5 | | 6.7 |
| 2.0 | 12.6 | |
| 2.5 | | 8.1 |
| 3.0 | 20.7 | |
| 3.5 | | 3.3 |
| 4.0 | 24.0 | |
| 4.5 | | 4.6 |
| 5.0 | 28.6 | |
| 5.5 | | 7.4 |
| 6.0 | 36.0 | |
| 6.5 | | 7.7 |
| 7.0 | 43.7 | |
| 7.5 | | 7.8 |
| 8.0 | 51.5 | |
| 8.5 | | 7.7 |
| 9.0 | 59.2 | |
| 9.5 | | |
| Out at 9:42 | 62.5 | |

[1] STP 100% relative humidity.

TABLE II

| | Cumulative volume [1] | Average rate |
|---|---|---|
| Time, minutes: | | |
| 0.5 | | 6.9 |
| 1.0 | 6.9 | |
| 1.5 | | 7.6 |
| 2.0 | 14.5 | |
| 2.5 | | 7.3 |
| 3.0 | 21.8 | |
| 3.5 | | 6.15 |
| 4.0 | 27.95 | |
| 4.5 | | 6.55 |
| 5.0 | 34.5 | |
| 5.5 | | 4.9 |
| 6.0 | 39.4 | |
| 6.5 | | 7.9 |
| 7.0 | 47.3 | |
| 7.5 | | 8.0 |
| 8.0 | 55.3 | |
| 8.5 | | |
| Out at 8:49 | 59.57 | |

[1] STP 100% relative humidity.

TABLE III

| | Cumulative volume [1] | Average rate |
|---|---|---|
| Time, minutes: | | |
| 0.5 | | 7.4 |
| 1.0 | 7.4 | |
| 1.5 | | 7.2 |
| 2.0 | 14.6 | |
| 2.5 | | 3.25 |
| 3.0 | 17.8 | |
| 3.5 | | 6.05 |
| 4.0 | 23.9 | |
| 4.5 | | 6.6 |
| 5.0 | 30.5 | |
| 5.5 | | 6.8 |
| 6.0 | 37.3 | |
| 6.5 | | 6.6 |
| 7.0 | 43.9 | |
| 7.5 | | 7.3 |
| 8.0 | 51.2 | |
| 8.5 | | 7.5 |
| 9.0 | 58.7 | |
| 9.5 | | |
| Out at 9:37 | 60.81 | |

[1] STP 100% relative humidity.

TABLE IV

| | Cumulative volume [1] | Average rate |
|---|---|---|
| Time, minutes: | | |
| 0.5 | | 6.5 |
| 1.0 | 6.5 | |
| 1.5 | | 8.0 |
| 2.0 | 14.5 | |
| 2.5 | | 7.1 |
| 3.0 | 21.6 | |
| 3.5 | | 6.7 |
| 4.0 | 28.3 | |
| 4.5 | | 7.0 |
| 5.0 | 35.3 | |
| 5.5 | | 6.7 |
| 6.0 | 42.1 | |
| 6.5 | | 7.0 |
| 7.0 | 49.1 | |
| 7.5 | | 7.3 |
| 8.0 | 56.4 | |
| 8.5 | | |
| Out at 8:44 | 58.5 | |

[1] STP 100% relative humidity.

TABLE V

| | Cumulative volume [1] | Average rate |
|---|---|---|
| Time, minutes: | | |
| 0.5 | | 5.9 |
| 1.0 | 5.9 | |
| 1.5 | | 6.4 |
| 2.0 | 12.3 | |
| 2.5 | | 6.1 |
| 3.0 | 18.4 | |
| 3.5 | | 6.2 |
| 4.0 | 24.6 | |
| 4.5 | | 5.8 |
| 5.0 | 30.4 | |
| 5.5 | | 5.9 |
| 6.0 | 36.3 | |
| 6.5 | | 6.3 |
| 7.0 | 42.6 | |
| 7.5 | | 6.3 |
| 8.0 | 48.9 | |
| 8.5 | | 6.4 |
| 9.0 | 55.3 | |
| 9.5 | | 5.8 |
| 10.0 | 61.1 | |
| Out at 10:13 | 61.23 | |

[1] STP 100% relative humidity.

FIG. 1 is a graph of the results recorded in Table 1 and obtained on a candle composed of 3% by weight of sodium oxide commercial grade powder and 97% sodium chlorate commercial grade which had been ground together for thirty minutes in a ball mill. As is apparent from the graph, the rate of flow increased rapidly for a period of two minutes and then decreased rapidly for one minute and again increased rapidly after which it held a relatively steady rate until the candle was substantially exhausted.

Figure 2:
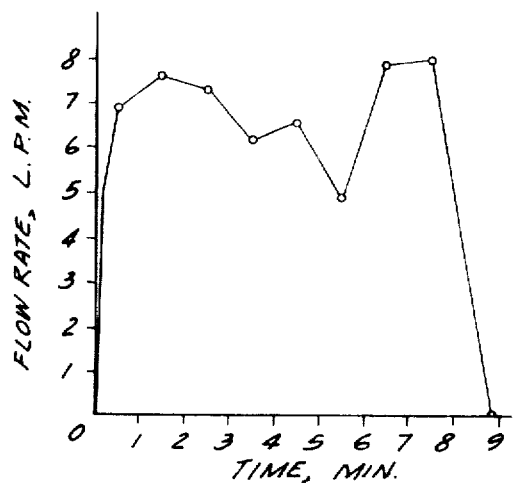

FIG. 2 is a graph of the results recorded in Table II obtained on a candle composed of 3% by weight sodium oxide, 3% by weight of commercial grade powdered sodium peroxide and 94% sodium chlorate. As is evident from the graph, the rate of flow decreased after one minute until the end of five minutes when it suddenly increased again.

Figure 3:
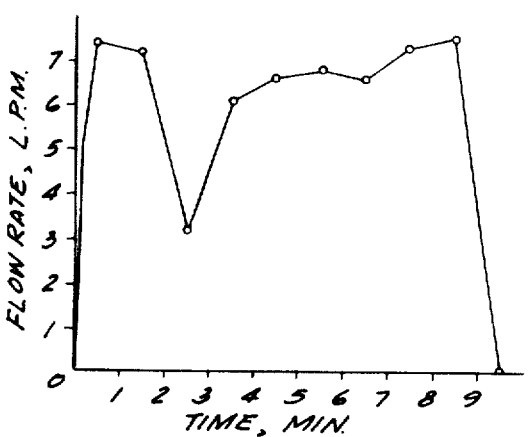
FIG. 3 is a graph showing rate of oxygen production from a candle made from a mixture of sodium chlorate, potassium perchlorate, sodium oxide and sodium peroxide.

Table III and FIG. 3 show the results on a composition composed of 3% by weight of sodium oxide, 3% sodium peroxide, 4% potassium perchlorate reagent grade and 90% sodium chlorate. Potassium perchlorate was tested as a stabilizing agent since it is suggested in U.S. Pat. 3,207,695 that this compound has a stabilizing influence. As is evident from the graph, potassium perchlorate was not effective to prevent the wide variation in oxygen flow, although it did have some effect in slowing the reaction rate. This is to be expected from the fact that the perchlorates have a relatively low heat of decomposition.

Figure 4:
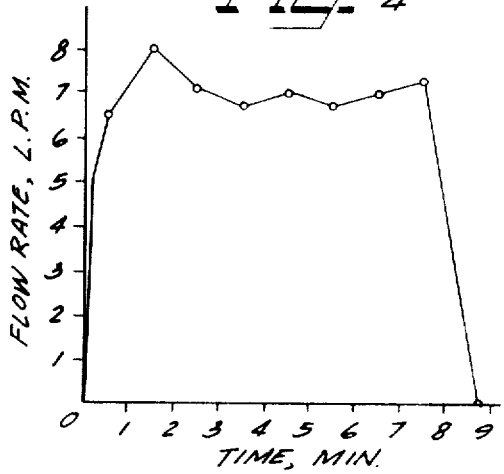
FIGS. 4 and 5 are graphs showing rate of production of candles made from compositions in accordance with this invention.

Table IV and FIG. 4 show the results obtained with a composition composed of 3% by weight of sodium peroxide, 3% of sodium monoxide, 4% powdered glass of approximately 200 mesh obtained from Fisher Scientific Company and 90% sodium chlorate. The glass analyzed $SiO_2$—72.8%, $Al_2O_3$—1.3%, $CaO$—8%, $MgO$—3.9%, $(SO_4)$—0.3%, Fe oxides—0.1%, $Na_2O + K_2O$—13.6%.

The mixture was ground together in a ball mill for 15 minutes. As shown by FIG. 4, after the initial surge the oxygen flow rate stabilized at about 7 liters per minute. One of the drawbacks of glass, however, is that it decreases the life and total oxygen yield of the composition.

Figure 5:
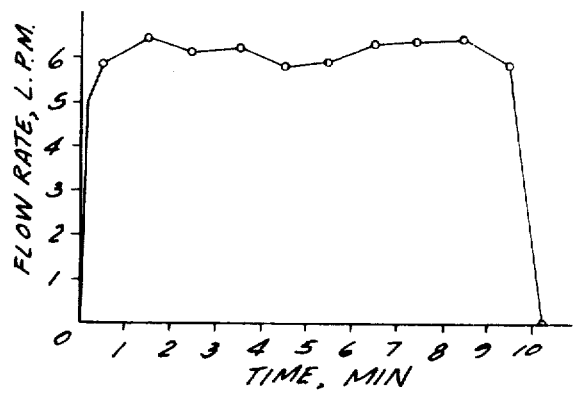

Table V and FIG. 5 show the results obtained from a candle prepared from a mixture of 3% by weight of sodium oxide, 3% sodium peroxide, 4% mica and 90% sodium chlorate. The powdered mica was approximately 160 mesh and obtained from Fisher Scientific Company. As demonstrated by FIG. 5, this composition proved to be the best with regard to rate stabilization of oxygen production. The rate stabilized at approximately 6 liters per minute over the life of the composition, and the candle life was approximately 10 minutes which was longer than any of the other candles tested. The oxygen produced was contaminated with an impurity which was apparently contained in the mica which was a natural variety.

After testing a number of powdered micas, it was found that a synthetic mica called "Synthamica 202," a product marketed by the Mycalex Company of Clifton, N.J. and having the empirical formula, $K_2Mg_6Al_2Si_6O_{20}F_4$, was found to give satisfactory rate stabilization without introducing contaminants into the oxygen.

Glass not only functions to smooth out the rate of oxygen production, but it has the additional advantage of tying up the sodium oxide catalyst after the candle is exhausted, thereby mitigating the hazard of $Na_2O_2$ in the exhausted candle. It has the advantage of reducing the grinding time necessary to produce a homogeneous mixture. Silica appears to be substantially as effective as glass and acts to tie up the sodium oxide in the same manner. It does not interfere with the catalytic activity of the oxide.

It will be seen therefore that by incorporating a small amount of silica or natural or synthetic silicates such as mica and vitreous glasses in the chlorate sodium oxide candle the rate of oxygen production can be stabilized making the generator usable for emergency breathing purposes. Although a so-called soda-lime glass was used on the test represented by Table IV and FIG. 4, it will be understood that other types of glasses are suitable such as boro-silicate, lead-potash, Pyrex, and potash-lime.

I claim as my invention:

1. A composition useful for generating oxygen consisting essentially of a homogeneous mixture of a predominating amount of alkali metal chlorate, at least one oxide of the group consisting of sodium and potassium oxides in an amount to produce self-sustaining oxygen generation, and a material from the group consisting of mica, silica and glass, the material of said group being present in an amount which significantly reduces variation in the rate of oxygen generation.

2. A composition in accordance with claim 1 in which the oxide is a mixture of sodium monoxide and sodium peroxide and the material is mica.

3. A composition in accordance with claim 2 in which the sodium oxide is present in an amount of approximately 6% by weight and the mica is present in an amount o fapproximately 0.5 to 6% by weight.

4. A composition in accordance with claim 3 in which the alkali metal chlorate is sodium chlorate.

5. A composition in accordance with claim 4 in which the sodium oxide consists of approximately equal amounts of sodium monoxide and sodium peroxide.

6. A composition in accordance with claim 5 in which the chlorate is present in an amount of approximately 90% by weight.

7. A composition in accordance with claim 6 in which the mica is a synthetic product having the empirical formula $K_2Mg_6Al_2Si_6O_{20}F_4$.

8. The composition in accordance with claim 7 in which the mixture is in the form of a candle formed by compressing the mixture in a mold.

9. A candle in accordance with claim 8 having a recess at one end containing an ignition cone.

10. A candle in accordance with claim 9 in which the ignition cone is composed of sodium iodate, sodium monoxide, magnesium perchlorate and sodium perchlorate in amounts of 41.1, 44.1, 5.8 and 9.0%, respectively, by weight.

11. The composition in accordance with claim 1 in which the material is finely divided glass in an amount of about 0.5 to 6% by weight.

12. The composition in accordance with claim 1 in which the material is finely divided silica in an amount between about 0.5 to 6% by weight.

13. The composition in accordance with claim 1, which consists essentially of sodium chlorate, at least one oxide of sodium and a material of the group consisting of mica, silica and glass.

14. The composition in accordance with claim 13 in which the material is finely divided glass in an amount of about 0.5 to 6% by weight.

15. The composition in accordance with claim 13 in which the material is finely divided silica in the amount of about 0.5 to 6% by weight.

16. The composition in accordance with claim 1 in which the material is mica.

17. The composition in accordance with claim 16 in which the mica is a synthetic mica having the empirical formula $K_2Mg_6Al_2Si_6O_{20}F_4$.

18. The composition in accordance with claim 2 in which the alkali metal chlorate is sodium chlorate and the mica is present in an amount of about 0.5 to 6% by weight.

19. An oxygen generating composition which when ignited generates oxygen by catalytic decomposition at relatively low temperatures consisting essentially of an alkali metal chlorate as the predominant component, a minor but sufficient amount of a sodium or potassium oxide catalyst to catalyze self-sustaining oxygen-liberating decomposition of the alkali metal chlorate, and a minor but sufficient amount of an oxygen-generating rate stabilizer from the group consisting of mica, silica and glass to significantly reduce variation in the rate of oxygen generation, said composition being compressed together to form a candle, and an ignition composition, capable of initiating the aforesaid decomposition, on an end of the candle.

20. An oxygen generatng composition in accordance with claim 19, in which the rate stabilizer is vitreous glass.

References Cited

UNITED STATES PATENTS

| | | | |
|---|---|---|---|
| 2,469,414 | 5/1949 | Schechter | 252—187 R |
| 2,558,756 | 7/1951 | Jackson et al. | 23—281 |
| 2,775,511 | 12/1956 | Geffroy et al. | 23—281 |
| 3,089,855 | 5/1963 | Bovard | 252—186 |
| 3,174,936 | 3/1965 | Gustafson et al. | 252—186 |
| 3,207,695 | 9/1965 | Gustafson | 252—186 |
| 3,293,187 | 12/1966 | Markowitz | 252—186 |

FOREIGN PATENTS

| | | | |
|---|---|---|---|
| 213,686 | 8/1906 | Germany | 252—186 |

LEON D. ROSDOL, Primary Examiner

I. GLUCK, Assistant Examiner

U.S. Cl. X.R.

23—281; 252—186; 423—240, 643